US012585210B2

(12) United States Patent
Kyogoku

(10) Patent No.: US 12,585,210 B2
(45) Date of Patent: Mar. 24, 2026

(54) IMAGE FORMING APPARATUS

(71) Applicant: KYOCERA Document Solutions Inc., Osaka (JP)

(72) Inventor: Masanori Kyogoku, Osaka (JP)

(73) Assignee: Kyocera Document Solutions, Inc. (JP)

( * ) Notice: Subject to any disclaimer, the term of this patent is extended or adjusted under 35 U.S.C. 154(b) by 210 days.

(21) Appl. No.: 18/658,917

(22) Filed: May 8, 2024

(65) Prior Publication Data

US 2024/0377771 A1 Nov. 14, 2024

(30) Foreign Application Priority Data

May 11, 2023 (JP) ................................ 2023-078374

(51) Int. Cl.
*G03G 15/043* (2006.01)

(52) U.S. Cl.
CPC ... *G03G 15/043* (2013.01); *G03G 2215/0404* (2013.01)

(58) Field of Classification Search
CPC ........... G03G 15/043; G03G 2215/0404; B41J 2/435; B41J 2/471; G02B 7/00; G02B 7/022; G02B 7/023
See application file for complete search history.

(56) References Cited

U.S. PATENT DOCUMENTS

2020/0041924 A1* 2/2020 Mizutani .............. G03G 15/043
2022/0269191 A1* 8/2022 Nakamura ........... G03G 15/043

FOREIGN PATENT DOCUMENTS

JP 10148773 * 6/1998 ............ G02G 26/10
JP 2003-329957 11/2003

* cited by examiner

*Primary Examiner* — Kristal Feggins

(57) ABSTRACT

An image forming apparatus includes a photoconductor drum, an exposure device, a development device, and a controller. The exposure device irradiates the photoconductor drum with a light beam and thereby forms an electrostatic latent image. The development device causes toner to adhere to the electrostatic latent image and thereby generates a toner image. The controller controls the exposure device. Further the exposure device includes a polygon mirror, a polygon motor, a mark detector, and an actuator. The polygon mirror is configured to scan the light beam. The polygon motor is configured to rotate the polygon mirror. The mark detector is configured to detect a mark attached to a motor axis of the polygon motor. The actuator is configured to be enabled to move the mark detector. Furthermore, the controller moves the mark detector to a position corresponding to an operation condition of the exposure device using the actuator.

5 Claims, 3 Drawing Sheets

IMAGE FORMING APPARATUS

CROSS-REFERENCE TO RELATED APPLICATIONS

This application relates to and claims priority rights from Japanese Patent Application No. 2023-078374, filed on May 11, 2023, the entire disclosures of which are hereby incorporated by reference herein.

BACKGROUND

1. Field of the Present Disclosure

The present disclosure relates to an image forming apparatus.

2. Description of the Related Art

An image forming apparatus includes a light beam scanning device that performs scanning of a light beam using a polygon mirror. In such a light beam scanning device, lengths of plural reflection surfaces of the polygon mirror have fluctuation, and therefore, in order to restrain a fluctuation of a scanning period in a primary scanning direction, each reflection surface is identified and correction of the scanning period is required for each reflection surface.

An image forming apparatus detects a mark attached on an axis of motor that rotates a polygon mirror using a reflective-type optical sensor to identify each reflection surface, and thereby identifies each reflection surface. Further, the aforementioned mark is detected on the basis of a sensor signal outputted from the reflective-type optical sensor, a detection timing of the mark is set as a reference, each reflection surface is identified on the basis of a relative light beam detection timing of a BD sensor (a sensor that detects a scanned light beam at a predetermined position), and the aforementioned correction is performed. For example, identified as the first surface is a reflection surface that reflects the light beam from the first light beam detection timing after the detection timing of the mark to the next light beam detection timing; and afterward, the second and subsequent surfaces are identified using the light beam detection timings.

In the aforementioned image forming apparatus, an output waveform (waveform of the sensor signal) of the reflective-type optical sensor varies due to an operational condition of the image forming apparatus (the light beam scanning device), and therefore, a wrong reflection surface of the polygon mirror is detected in error due to overlapping of the detection timing of the mark and the light beam detection timing of the BD sensor or misdetecting as the mark a balancer (a weight such as sticky substance or adhesive) attached to the motor axis for restraining eccentricity.

SUMMARY

An image forming apparatus according to an aspect of the present disclosure includes a photoconductor drum, an exposure device, a development device, and a controller. The exposure device is configured to irradiate the photoconductor drum with a light beam and thereby form an electrostatic latent image. The development device is configured to cause toner to adhere to the electrostatic latent image and thereby generate a toner image. The controller is configured to control the exposure device. Further the exposure device includes a polygon mirror, a polygon motor, a mark detector, and an actuator. The polygon mirror is configured to scan the light beam. The polygon motor is configured to rotate the polygon mirror. The mark detector is configured to detect a mark attached to a motor axis of the polygon motor. The actuator is configured to be enabled to move the mark detector. Furthermore, the controller moves the mark detector using the actuator to a position corresponding to an operation condition of the exposure device.

These and other objects, features and advantages of the present disclosure will become more apparent upon reading of the following detailed description along with the accompanied drawings.

DETAILED DESCRIPTION

Hereinafter, embodiments according to an aspect of the present disclosure will be explained with reference to drawings.

Embodiment 1

Figure 1:
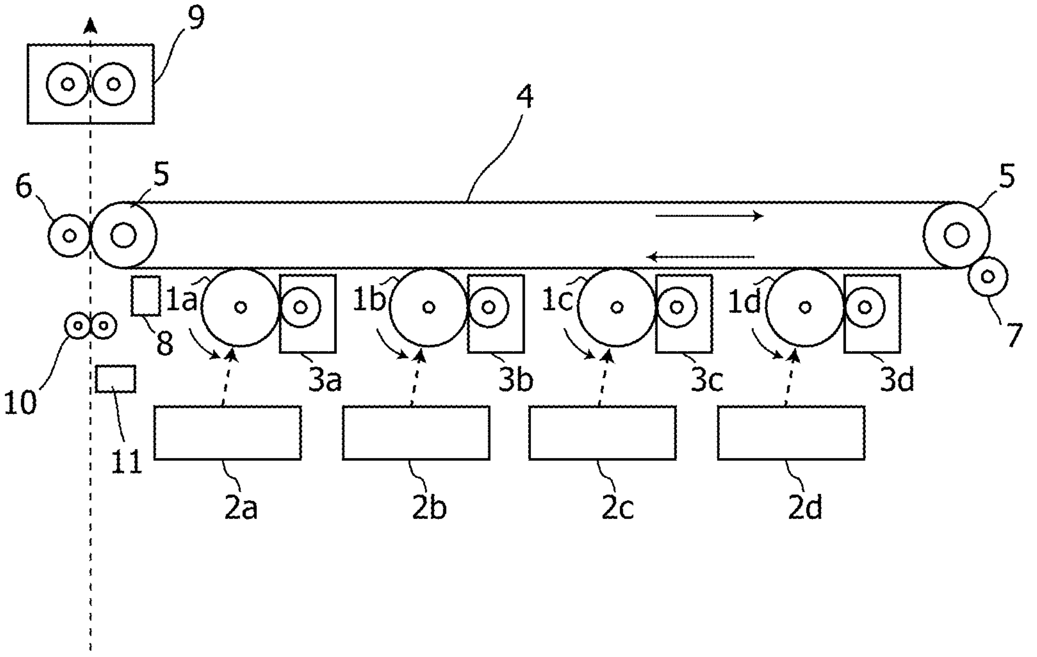
FIG. 1 shows a side view that indicates an internal mechanical configuration of an image forming apparatus in an embodiment according to the present disclosure.

FIG. 1 shows a side view that indicates an internal mechanical configuration of an image forming apparatus in an embodiment according to the present disclosure. The image forming apparatus shown in FIG. 1 is an apparatus having an electrophotographic printing function, such as a printer, a facsimile machine, a copier or a multi function peripheral.

The image forming apparatus in this embodiment includes a tandem-type color development device. This color development device includes photoconductor drums 1*a* to 1*d*, exposure devices 2*a* to 2*d*, and development devices 3*a* to 3*d*. The photoconductor drums 1*a* to 1*d* are photoconductors of four toner colors: Cyan, Magenta, Yellow and Black.

The exposure devices 2*a* to 2*d* irradiate the photoconductor drums 1*a* to 1*d* with laser light beams and thereby form electrostatic latent images. The exposure devices 2*a* to 2*d* are laser scanning units that have laser diodes as light sources of the laser light beams, optical elements (such as lens, mirror and polygon mirror) that guide the laser light beams to the respective photoconductor drums 1*a* to 1*d*.

Further, the periphery of each one of the photo conductor drums 1*a* to 1*d* includes a charging unit such as scorotron, a cleaning device, a static electricity eliminator and the like. The cleaning device removes residual toner on each one of the photo conductor drums 1*a* to 1*d* after primary transfer. The static electricity eliminator eliminates static electricity of each one of the photoconductor drums 1*a* to 1*d* after primary transfer.

Toner cartridges which contain toner of four colors: Cyan, Magenta, Yellow and Black are attached to the development devices 3*a* to 3*d*, respectively. In the development devices 3*a* to 3*d*, the toner is supplied from the toner cartridges, and this toner and carrier compose developer. The development devices 3*a* to 3*d* causes the toner to adhere to the photoconductor drums 1*a* to 1*d* and thereby forms toner images.

The photoconductor drum 1*a*, the exposure device 2*a* and the development device 3*a* perform development of Magenta. The photoconductor drum 1*b*, the exposure device 2*b* and the development device 3*b* perform development of Cyan. The photoconductor drum 1*c*, the exposure device 2*c* and the development device 3*c* perform development of Yellow. The photoconductor drum 1*d*, the exposure device 2*d* and the development device 3*d* perform development of Black.

The intermediate transfer belt 4 is a loop-shaped image carrier, and contacts the photoconductor drums 1*a* to 1*d*. Toner images on the photoconductor drums 1*a* to 1*d* are primarily transferred onto the intermediate transfer belt 4. The intermediate transfer belt 4 is hitched around driving rollers 5, and rotates by driving force of the driving rollers 5 towards the direction from the contact position with the photoconductor drum 1*d* to the contact position with the photoconductor drum 1*a*.

A transfer roller 6 causes an incoming paper sheet in transportation to contact the transfer belt 4, and secondarily transfers the toner image on the transfer belt 4 to a print sheet. The print sheet on which the toner image has been transferred is transported to a fuser 9, and consequently, the toner image is fixed on the print sheet.

A roller 7 has a cleaning brush, and removes residual toner on the intermediate transfer belt 4 by contacting the cleaning brush to the intermediate transfer belt 4 after transferring the toner image to a print sheet.

A sensor 8 is an optical sensor that measures a density of a developed toner patch image in the calibration, and irradiates the intermediate transfer belt 4 with a light beam and detects its reflected light. For example, when adjusting a toner density in the calibration, the sensor 8 irradiates a predetermined area (toner patch image or surface material of the intermediate transfer belt 4) on the intermediate transfer belt 4, detects its reflected light, and outputs an electric signal corresponding to a light amount of the reflected light.

A registration roller 10 temporarily stops the incoming print sheet transported from a print sheet feeding tray or the like in primary paper sheet feeding, and at a second feeding timing, transports the print sheet to a transfer position between the intermediate transfer belt 4 and the transfer roller 6. The second feeding timing is specified so as to cause a toner image on the intermediate transfer belt 4 to be transferred to a specified position on the print sheet. A registration sensor 11 is a sensor that is arranged near the registration roller 10, and optically detects that a print sheet reaches the registration roller 10 (i.e. registration position).

Figure 2:
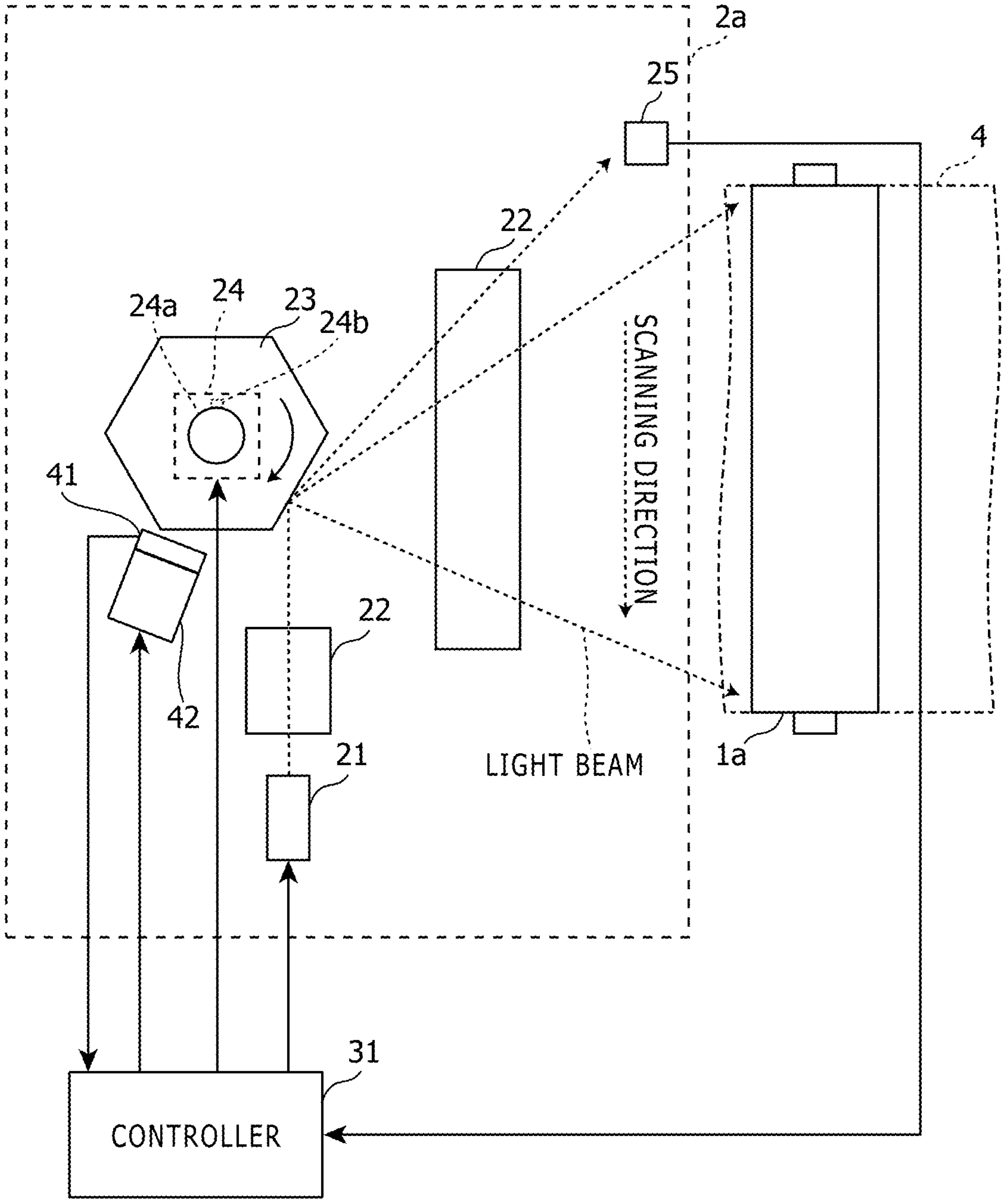
FIG. 2 shows a diagram that indicates an example of a configuration of an exposure device 2*a* shown in FIG. 1 and a configuration of its peripheral electronic circuit.

FIG. 2 shows a diagram that indicates an example of a configuration of an exposure device 2*a* shown in FIG. 1 and a configuration of its peripheral electronic circuit. The exposure device shown in FIG. 2 is the exposure device 2*a* for the photoconductor drum 1*a*, and each of the exposure devices 2*b* to 2*d* for the photoconductor drums 1*b* to 1*d* has the same configuration.

In FIG. 2, a light source 21 is a light source (laser diode or the like) that emits laser beams. An optical system 22 includes lenses arranged between the light source 21 and a polygon mirror 23 and/or between the polygon mirror 23 and the photoconductor drum 1*a* or a BD sensor 25. As the optical system 22, f-Theta lens or the like is used.

Further, the polygon mirror 23 is an element connected to a motor axis 24*a* of the polygon motor 24 such that the motor axis 24*a* is perpendicular to an axis of the photoconductor drum 1*a*, a cross section of the polygon mirror 23 perpendicular to the motor axis 24*a* has a polygon shape (e.g. hexagon shape), and plural side surfaces of the polygon mirror 23 are planar mirrors (reflection surfaces).

The polygon mirror 23 rotates around the motor axis 24*a*, and scans the laser light emitted from the light source 21, along an axis direction of the photoconductor drum 1*a* (i.e. along a primary scanning direction). A polygon motor 24 causes the polygon mirror 23 to rotate in accordance with a control signal supplied from a controller 31. For example, the polygon motor 24 causes the polygon mirror 23 to rotate at a rotation speed (rotation frequency) specified by the control signal.

Further, the BD (Beam Detection) sensor 25 is a sensor that receives at a predetermined position the laser light beam scanned by the polygon mirror 23 to generate a primary-scanning-directional synchronization signal. When light enters the BD sensor 25, the BD sensor 25 induces an output voltage corresponding to an amount of the light beam. The BD sensor 25 is arranged at a predetermined position on a scanning line of the light beam, detects a timing that a spot of the light beam passes through this position, and outputs as the primary-scanning-directional synchronization signal a pulse formed at this timing.

The controller 31 includes an ASIC (Application Specific Integrated Circuit), a computer and/or the like and performs control of an internal device of this image forming apparatus, a data process and the like, and controls the exposure device 2*a* (the light source 21, the polygon motor 24, an actuator 42 mentioned below and the like) and thereby exposures the photoconductor drum 1*a* with the laser light beam correspondingly to an image to be formed. The light source 21 is controlled such that the photoconductor drum 1*a* is exposed with the laser light beam of a pattern corresponding to an image to be formed in synchronization with the primary-scanning-directional synchronization signal.

Further, the exposure device 2*a* includes a mark detector 41, and the actuator 42 that is enabled to move the mark detector 41. The mark detector 41 is a sensor that detects a mark attached to a motor axis of the polygon motor, and here a reflective-type optical sensor that performs irradiation with light and detects reflection light of the irradiation light. Furthermore, the controller 31 moves the mark detector 41 using the actuator 42 to a position corresponding to an operation condition of the exposure device 2*a*.

Figure 3:
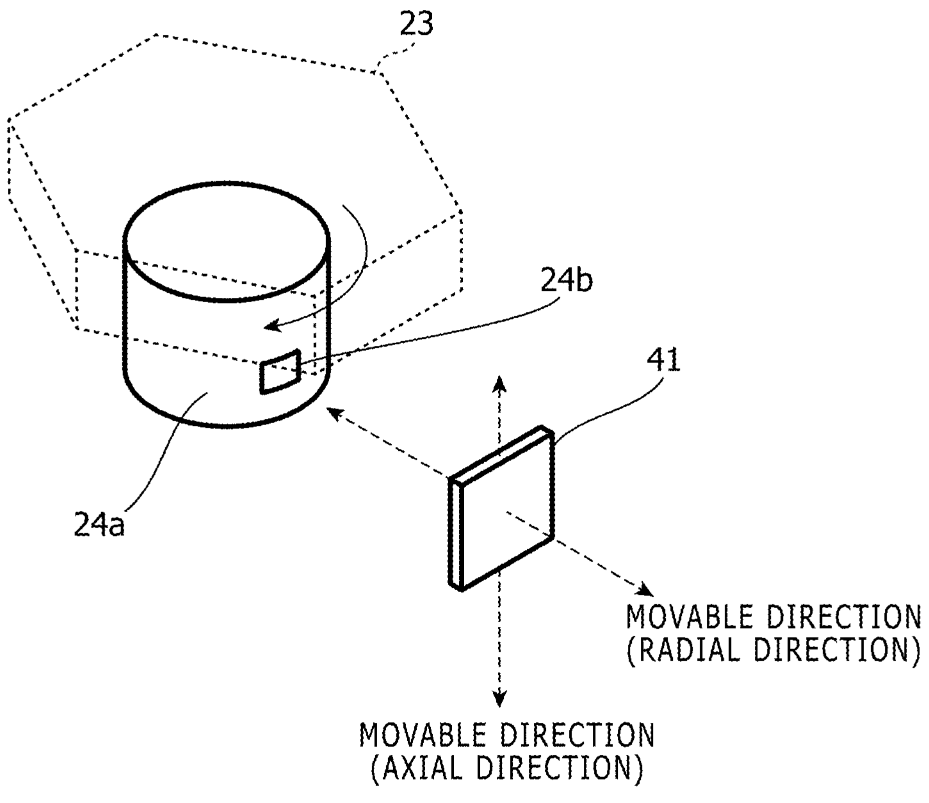
FIG. 3 shows a perspective-view diagram that explains position control of the mark detector 41 in the exposure device 2*a* shown in FIG. 2.

FIG. 3 shows a perspective-view diagram that explains position control of the mark detector 41 in the exposure device 2*a* shown in FIG. 2. In Embodiment 1, as shown in FIG. 3 for example, the actuator 42 is enabled to move the mark detector 41 along one or both (here, both) of a radial direction and an axial direction of the motor axis 24*a*. Thus, the actuator 42 is a 2-axis actuator.

The controller 31 moves the mark detector 41 using the actuator 42 to a position corresponding to a rotation speed of the polygon motor 23 in the radial direction of the motor axis 24*a*. Specifically, the mark detector 41 is approached closer to the motor axis 24*a* (the mark 24*b*) correspondingly to a higher rotation speed of the polygon mirror 23. The higher the rotation speed is, the shorter the time that the mark 24*b* passes through a detection area of the mark detector 41 is and the lower the peak of a pulse in an output signal of the mark detector 41, and therefore, the mark detector 41 is approached closer to the motor axis 24*a* (the mark 24*b*). Consequently, a received light amount of the mark detector 41 (i.e. a received light amount of reflection light from the mark 24*b*) gets large, and therefore, a favorable pulse is detected in the output signal of the mark detector 41. When the rotation speed is low, a light amount of the reflection light from the mark 24*b* is sufficiently large, and therefore, the mark detector 41 is arranged at a proper position corresponding to a sensitivity of the mark detector 41.

Further, if the rotation speed of the polygon mirror 23 exceeds a predetermined value, the controller 31 may move the mark detector 41 using the actuator 42 to a height position (a position in the axial direction) that the aforementioned balancer does not exist. Specifically, as mentioned, if the rotation speed is high, a peak of the pulse in the output signal of the mark detector 41 is low and reflection light from the aforementioned balancer may be misdetected as reflection light from the mark 24*b*; and therefore the mark detector 41 may be moved as mentioned.

The following part explains a behavior of the aforementioned image forming apparatus 1.

In a print job, the controller 31 controls the polygon motor 24 and thereby rotates the polygon mirror at a rotation speed corresponding to a specified linear velocity, and controls the actuator 42 and thereby arranges the mark detector 41 at a position corresponding to the rotation speed.

Further, the controller 31 determines a detection timing of the mark 24*b* on the basis of an output waveform (i.e. a waveform of the output signal) of the mark detector 41, and causes the light source 21 to emit a laser light beam of a pattern corresponding to an image to be printed while identifying each reflection surface of the polygon mirror 23 on the basis of the detection timing as the reference and performing the correction corresponding to the identified reflection surface.

In the aforementioned manner, each of the photoconductor drums 1*a* to 1*d* is irradiated with a laser light beam and thereby an electrostatic latent image is formed, the electrostatic latent image is developed with toner, primary transfer and secondary transfer of the developed image are performed and thereby a color toner image is formed on a print sheet, and fixing of the toner image is performed by the fuser 9.

As mentioned, in the aforementioned embodiment, the exposure device 2*a*, 2*b*, 2*c* or 2*d* includes the polygon mirror 23 that scans the light beam, the polygon motor 24 that rotates the polygon mirror 23, the mark detector 41 that detects the mark 24*b* attached to the motor axis 24*a* of the polygon motor 24, and the actuator 42 that is enabled to move the mark detector 41. Further, the controller 31 moves the mark detector 41 using the actuator 42 to a position corresponding to an operation condition of the exposure device 2*a*, 2*b*, 2*c* or 2*d*.

Consequently, even if a characteristic of an output waveform of the mark detector 41 changes correspondingly to an operation condition of the exposure device 2*a*, 2*b*, 2*c* or 2*d*, the change of the characteristic is compensated by the movement of the mark detector 41, and therefore it is restrained that a reflection surface of the polygon mirror is wrongly identified.

Embodiment 2

In Embodiment 2, each of the exposure devices 2*a* to 2*d* includes a nonvolatile storage device (EEPROM (Electrically Erasable Programmable Read-Only Memory) or the like) that stores setting data for this exposure device 2*a*, 2*b*, 2*c* or 2*d*, and the controller 31 individually controls the exposure devices 2*a* to 2*d* in accordance with the setting data.

Here, the setting data includes data that indicates a relationship between rotation speeds of the polygon mirror 23 and positions of the mark detector 41, and the controller 31 determines a position of the mark detector 41 corresponding to a rotation speed of the polygon mirror 23 on the basis of the setting data, and moves the mark detector 41 to the determined position using the actuator 42.

The rotation speed of the polygon mirror 23 is set correspondingly to a linear velocity (number of printed sheets per unit time), and therefore, the controller 31 determines a position corresponding to the set rotation speed of the polygon mirror 23 on the basis of the setting data, and moves the mark detector 41 to the determined position.

Further, the setting data includes data that indicates a timing to be detected as a detection timing of the mark 24*b* among a rising timing and a falling timing in an output waveform of the mark detector 41. The controller 31 detects as a detection timing of the mark 24*b* a rising timing or a falling timing in an output waveform of the mark detector 41 in accordance with the setting data.

Other parts of the configuration and behaviors of the image forming apparatus in Embodiment 2 are identical or similar to those in Embodiment 1, and therefore not explained here.

As mentioned, in Embodiment 2, the controller 31 individually controls the exposure devices 2*a* to 2*d* in accordance with characteristics individually set in the respective storage devices of the exposure devices 2*a* to 2*d*, and consequently, it is further restrained that a reflection surface of the polygon mirror is wrongly identified.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiments, the controller 31 arranges the mark detector 41 at a position corresponding to a rotation speed of the polygon mirror 23, and further may set a position of the mark detector 41 correspondingly to a change of a peak level of the output waveform of the mark detector 41 that occurs due to aging changes of the exposure device 2*a*, 2*b*, 2*c* or 2*d*.

What is claimed is:

1. An image forming apparatus, comprising:

a photoconductor drum;

an exposure device configured to irradiate the photoconductor drum with a light beam and thereby form an electrostatic latent image;

a development device configured to cause toner to adhere to the electrostatic latent image and thereby generate a toner image; and a controller configured to control the exposure device;

wherein the exposure device comprises:

a polygon mirror configured to scan the light beam, a polygon motor configured to rotate the polygon mirror, a mark detector configured to detect a mark attached to a motor axis of the polygon motor, and an actuator configured to be enabled to move the mark detector; and the controller moves the mark detector using the actuator to a position corresponding to an operation condition of the exposure device.

2. The image forming apparatus according to claim 1, wherein the actuator is enabled to move the mark detector along one or both of a radial direction and an axis direction of the motor axis.

3. The image forming apparatus according to claim 1, wherein the controller moves the mark detector using the actuator to a position corresponding to a rotation speed of the polygon motor in a radial direction of the motor axis.

4. The image forming apparatus according to claim 3, wherein the exposure device comprises a storage device in which setting data has been stored and the setting data indicates a relationship between the rotation speed and the position; and the controller determines a position of the mark detector corresponding to the rotation speed on the basis of the setting data, and moves the mark detector to the determined position using the actuator.

5. The image forming apparatus according to claim 1, wherein the exposure device comprises a storage device in which setting data has been stored and the setting data indicates a timing to be detected as a detection timing of the mark among a rising timing and a falling timing in an output waveform of the mark detector; and the controller detects as a detection timing of the mark a rising timing or a falling timing in an output waveform of the mark detector in accordance with the setting data.

* * * * *